United States Patent [19]

Barnett

[11] Patent Number: 4,920,687

[45] Date of Patent: May 1, 1990

[54] ROTATING FISHING LURE SPREADER FOR USE WHILE TROLLING

[76] Inventor: O. Lynn Barnett, 39 Elora Ave., Akron, Ohio 44319

[21] Appl. No.: 373,266

[22] Filed: Jun. 29, 1989

[51] Int. Cl.⁵ ............................................. A01K 91/04
[52] U.S. Cl. .................................................. 43/42.74
[58] Field of Search ....................................... 43/42.74

[56] References Cited

U.S. PATENT DOCUMENTS

| | | | |
|---|---|---|---|
| 2,223,922 | 12/1940 | Schofield | 43/42.74 |
| 2,770,908 | 11/1956 | Hessert | 43/42.74 |
| 2,935,810 | 5/1960 | Giguere | 43/42.74 |
| 3,550,305 | 5/1969 | Santosuosso | 43/42.74 |

Primary Examiner—M. Jordan
Attorney, Agent, or Firm—Donald A. Bergquist

[57] ABSTRACT

A fishing device known as a spreader for trolling a plurality of baited hooks from a single fishing line wherein the spreader is a planar device with sweep arms extending from the body of the planar device and vanes that cause it to rotate as it moves relative to the water, thereby causing at least two fishing lures attached to the sweep arms to move in a helical pattern simulating the motion of fish swimming together. The hydrodynamic design provides for smooth operation in the water and reduces the propensity for the fishing lures to become entangled.

13 Claims, 2 Drawing Sheets

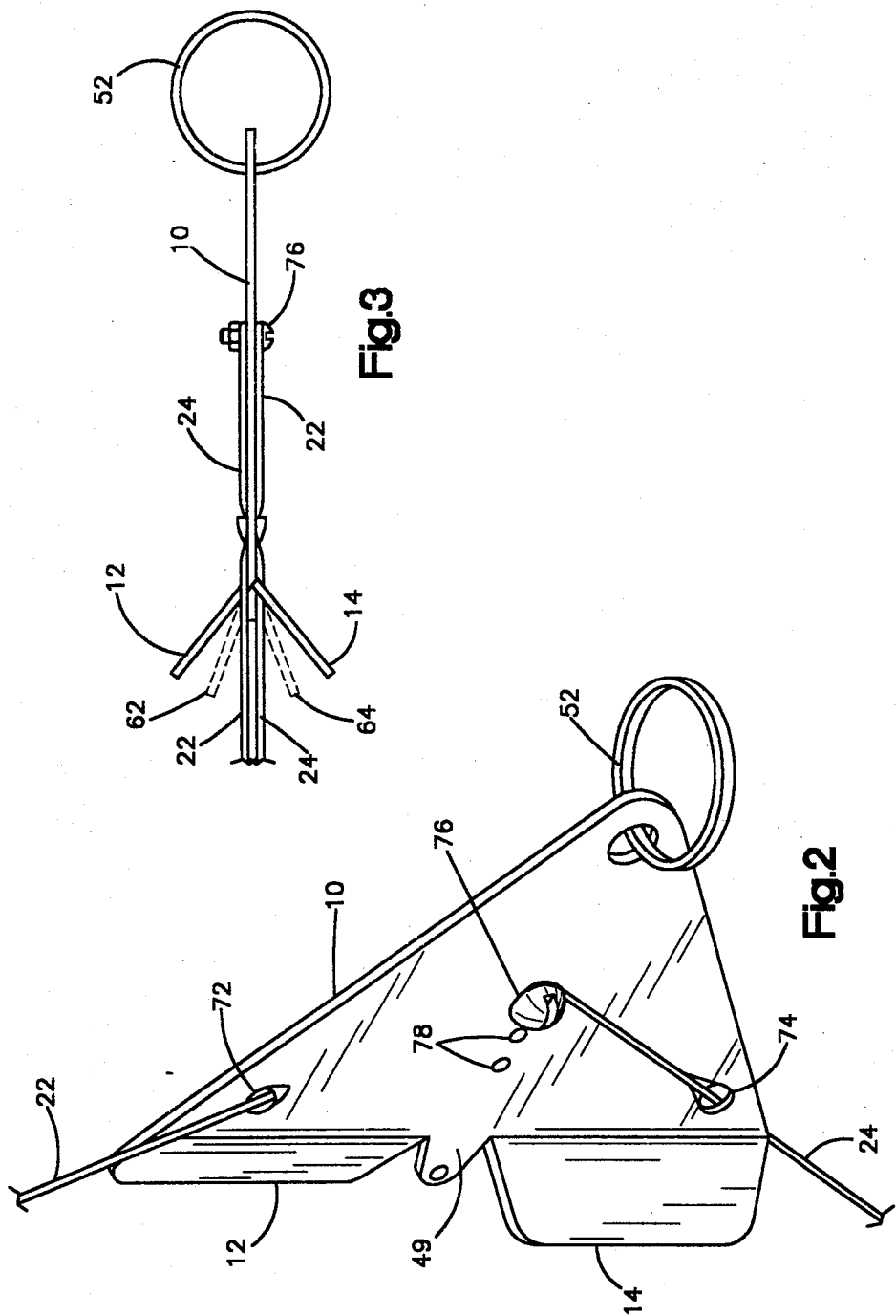

ROTATING FISHING LURE SPREADER FOR USE WHILE TROLLING

INTRODUCTION

A fishing device known as a spreader for trolling a plurality of baited hooks from a single fishing line wherein the spreader comprises a planar device with vanes that cause it to rotate as it moves relative to the water, thereby causing at least two baited hooks to move in a helical pattern simulating the motion of fish swimming together. The hydrodynamic design provides for smooth operation in the water and reduces the propensity for the baited hooks to become entangled.

1. BACKGROUND

Several inventors have provided spreaders by which two or more baited hooks may be connected to a single fishing line. Other inventors have created spreaders that cause the baited hooks to rotate about one another as the fish line is 'jigged' up and down in the water. Some of these inventors suggest that their devices can also be used for slow trolling. The present invention is fully capable of smooth operation during trolling at slow, moderate, or high speeds. The sweep arms of the present invention are adjustable in angle and are interchangeable to provide arms of various lengths as might be desired. Of these features, by far the most important is the fact that the sweep arms are at an obtuse angle to the direction of motion through the water; secondarily that the angle is adjustable; and least of all that arms of various lengths may be installed interchangeably on the body.

2. PRIOR ART

Spreaders and even rotating spreaders have been taught in the prior art. The following discussion summarizes the spreaders uncovered in searching the U.S. Patent Office's Classification 43/42.74, SPREADERS OR SEPARATORS FOR PLURAL LINES AND/OR HOOKS.

A basic spreader is presented in U.S. Pat. No. 2,733,536, issued to Terazono. Two arms are telescopically adjustable in length and a third arm is provided for the attachment of a third fish hook. No provision exists to cause rotation of the spreder and thereby to cause rotation of the bait or lures attached thereto. No intent is indicated for the spreader to be trolled or drawn through the water; therefore, there is no description of the spreader's arms, commonly called sweep arms, to be at a specified angle with the direction of motion. If this spreader were pulled through the water, however, all indications are that the sweep arms thereof would make a substantially right angle with the direction of motion. In contrast to Terazono's spreader, the sweep arm of the present invention make an obtuse angle with the direction of motion through the water while trolling, which feature improves the hydrodynamic stability of the entire assemblage as it is pulled through the water.

The Terazone spreader was modified somewhat in U.S. Pat. No. 2,930,159, issued to Culhane. The Culhane device has two arms of the telescopically extendable type taught by Terazono; when the spreader is in use, however, Culhane teaches that the arms are frictionally locked in the extended position. Culhane adds wings to provide rotation of the spreader as it is jigged up and down in the water, the wings being attached in a manner that provides rotation in a single direction to impart a uni-directional motion to the attached bait or lures thereby to better simulate swimming motion of bait fish.

The sweep arms of Culhane's spreader make a substantially right angle with the direction or directions of motion. It is not seen that trolling is suggested in the Culhane patent, though is may be obvious to attempt to use the invention while trolling. In contrast to Culhane's spreader, the sweep arms of the present invention make an obtuse angle with the direction of motion through the water while trolling, which feature improves the hydrodynamic stability of the entire assembly as it is pulled through the water.

The earliest rotating spreader uncovered in the preliminary search is that shown in U.S. Pat. No. 2,223,922, issued to Schofield. Schofield provides a single length of wire having suitable stiffness to form two arcuate sweep arms. A metal strip is formed in a shape resembling a propeller attached to the sweep arms and following the arc of the sweep arms to provide rotational forces to cause the spreader to rotate and thereby to cause the bait or lures attached to the ends of the sweep arms to revolve around a central axis. Schofield's spreader is suggested for use while either still-fishing or trolling. The sweep arms of the Schofield patent, having an arcuate shape, cannot be said to make a specific obtuse angle with the direction of motion of the spreader through the water; indeed, the direction of motion may be up and down during still-fishing to cause rotation of the spreader and hence the bait or lures, so the angle, which might be likened to an angle of attack, changes with direction. Applicant believes that the reason for the arcuate shape of the spreader in Schofield's patent is most likely to ensure the center of gravity of the device is below its point of support, thereby to increase its stability. The sweep arms of Schofield's spreader are integral with the central coil and loop and therefore are neither adjustable in angle nor replacable. In contrast, the sweep arms of the present invention make an obtuse angle with the direction of motion through the water, the angle is adjustable, and the sweep arms are replacable with arms having different design or length.

Yet another rotating spreader is presented in U.S. Pat. No. 4,021,959, issued to Antkowiak, wherein sweep arms are attached atop a transparent container designed to hold live bait fish swimming freely therein and wherein hooks with additional bait fish or lures are supported on the ends of the sweep arms. Blades on the periphery of the container induce a rotary motion thereto and to the sweep arms. Although the intended use of this device is for use in still-fishing, the patent specifies that it might also be used in slow trolling. The sweep arms, called spokes, extend radially from their central connection with the shaft of a connector. No curvature or angle with the direction of travel of the assembly through the water is mentioned or suggested. Applicant believes the nature of the container and spreader device as a whole would severely limit its usefulness in trolling to extremely slow trolling; indeed, it was not truly designed for trolling. In contrast, the present invention is more hydrodynamically stable while being drawn through the water and its stability may be improved for high-speed trolling by increasing the obtuse angle between the sweep arm and the direction of travel and by adjusting the rotation-imparting vanes of the body thereof.

An ARTIFICIAL FISHING BAIT is the subject of U.S. Pat. No. 2,933,847, issued to Frasure. This bait comprises a body made of two triangular-shaped layers of clear plastic with pictures of bait fish sandwiched between them; a fish hook is provided on two corners and a fish line is attached to the third corner. The intent is for fish to stike at the images of fish and be caught on the fish hooks. No rotational motion of the lure is suggested; no sweep arms are provided; the combined lengths of the hooks are "substantially less than the length of one edge" of the triangular body; the lure itself is the fish attractant and it trails no other lures or baits as it is pulled through the water. In contrast, the present invention is designed to impart rotation to the body thereof and, by means of attached sweep arms, to the leaders and lures or baited hooks attached thereto.

In the ensuing discussion, wherein the present invention is described in detail, additional distinctions from the prior art will become evident.

It is an object of this invention to provide a rotating spreader for fishing for use while trolling, which rotating spreader is hydrodynamically stable when being trolled at either slow speed, medium speed, or high speed.

It is a further object of this invention to provide such a rotating spreader having vanes for imparting the rotating motion, which vanes are adjustable to alter the rate of rotation of the spreader when it is trolled.

It is a further object of this invention to provide a rotating spreader having two or more sweep arms that make an obtuse angle with the intended direction of motion of the spreader through the water.

It is a further object of this invention to provide a rotating spreader wherein said obtuse angle is adjustable.

It is a further object of this invention to provide a rotating spreader wherein the sweep arms are replaceable.

BRIEF DESCRIPTION OF THE DRAWINGS

The description of this invention will be made more clear by reference to the following drawings, wherein in each of the several drawings, the same reference number is used to refer to the same element of the invention.

FIG. 2 is a perspective view of the rotating spreader of this invention.

FIG. 3 is an edgewise view of the rotating spreader of this invention.

DETAILED DESCRIPTION OF THE INVENTION

Figure 1:
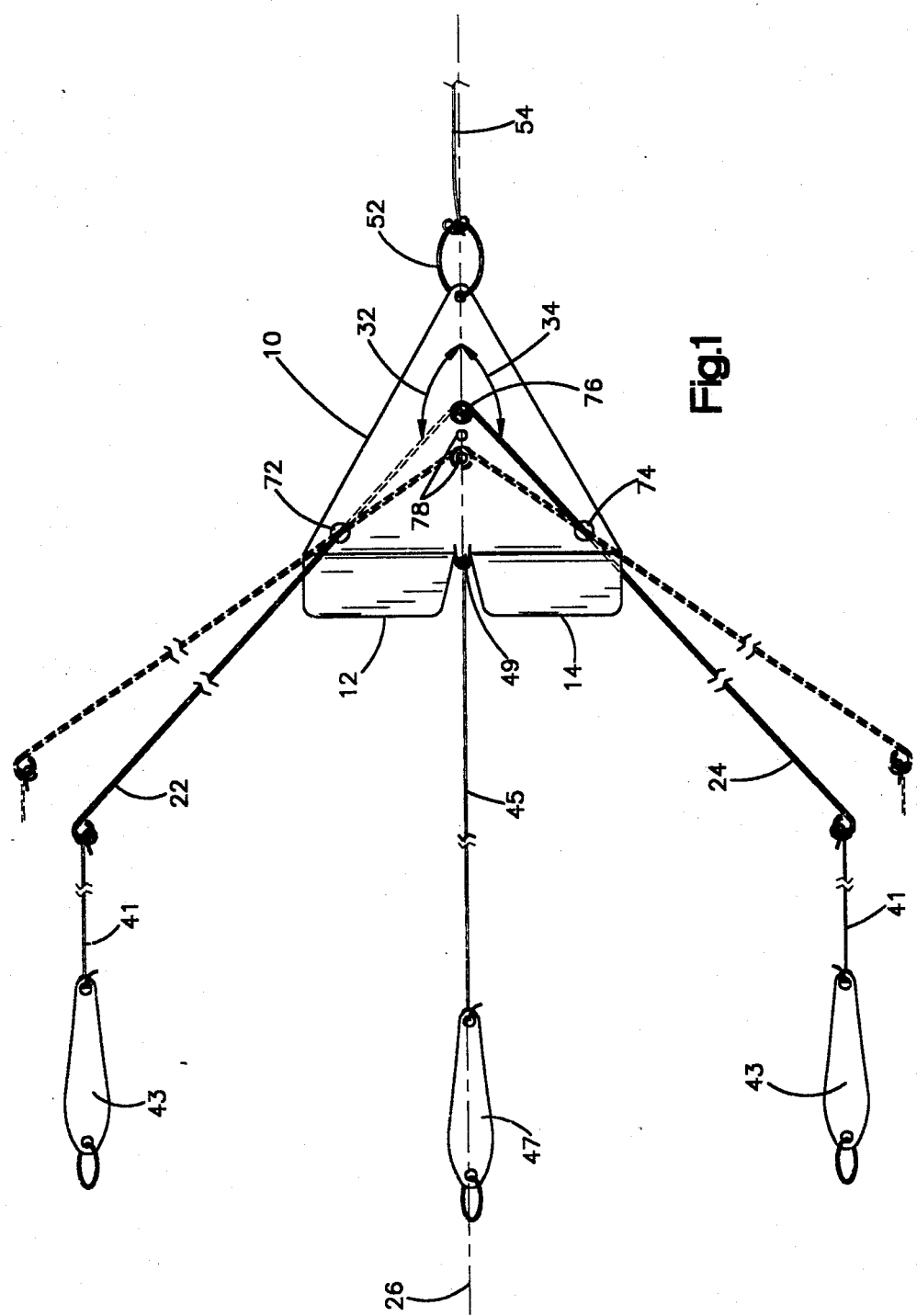
FIG. 1 is a plan view of the rotating spreader of this invention.

This invention is related to fishing spreaders, devices for attaching more than one bait or lure to a single fishing line wherein the lures are separated at a distance laterally from each other and from the main fish line. In rotating spreaders, the baits or lures are caused to revolve about the axis of the main fish line as the device is moved relative to the water, causing a net motion in a generally circular pattern relative to the line. Unlike any of the prior art devices, this invention is specifically designed for use while trolling. In trolling, the motion of the lures through the water is rather rapid and of unidirectional rotation, creating a helical pattern; this is to be contrasted with the much slower and usually bi-directional circular motion of the lures while still-fishing using a rotating spreader and activating the rotation of the spreader by 'jigging' the device up and down in the water.

Applicant's experience with trolling rotating spreaders similar to the prior art spreaders, wherein the sweep arms extend radially in both directions from the fish line, demonstrated that the motion of the device in the water was erratic and not smooth; thus the lures or the baits attached thereto did not exhibit the smooth swimming of bait fish in a school.

Early experiments were directed to obtaining the maximum distance between the lures trailing from the sweep arms during use of the device. The sweep arms were even formed of spring steel and curved forward of their attachment to the central body that generated the rotation, applicant expecting that the drag of the lures as the assembly was pulled through the water would straighten the sweep arms to attain the said maximum distance. These experiments taught applicant that this is the route to even greater instability of the spreader in the water.

Thus, applicant was led to adopt the present angled sweep arms, wherein the sweep arms form an obtuse angle with the direction of motion, as a more hydrodynamic shape. Applicant sees this invention as not obvious from the prior art, all of which teaches radial extension of the sweep arms wherein the sweep arms form a right angle with the direction of motion, at least they do so at their point of attachment along the axis of the main fish line. Such prior art teaches away from the present invention.

The body of the invention serves the function of a stabilizer, much as anti-rotation vanes that are sometimes used along the length of trolling lines; it also has trailing vans to produce a rotation as the body moves relative to the water in which it is immersed. Although these functions seem to be counteracting one another, it has been found by experiment that such counteraction is required for stability.

Thus, stable performance of a spreader for trolling is maximized by the use of a stabilizing body, the use of vanes on the body to produce rotation, and the use of back-swept sweep arms. Applicant's experiments have specifically shown that stability is diminished without the back-swept sweep arms. Further, it has been shown by experiment that the back-sweep should be greater at higher trolling speeds. Thus an adjustable back-sweep is desirable.

The present invention is shown in plan view FIG. 1. The body 10 is shown as triangular in shape, although other shapes may be suitable. Two vanes 12 and 14 along the trailing edge of the body extend out of the plane o the body in opposite directions to produce the desired rotation. Sweep arms 22 and 24 extend laterally substantially in the plane of the body and making obtuse angles 32 and 34 with the axis 26 of the body 10.

The sweep arms 22 and 24 are removable, replaceable, and may be adjusted to different sweep angles as shown in phantom in FIG. 1. The distal end of each sweep arm is adapted to recieve a leader 41 to which may be attached a baited hook or other fishing lure 43. The length of the sweep arm and the length of the leaders to be used may be any suitable length. It is preferred, however, that the total length of the leader and any lure or bait attachments thereto be no longer than the total length o the sweep arm to which it is attached. A third leader 45 and lure 47 or other fishing tackle may be attached at an axial location 49 centrally located on the trailing edge of the body 10.

For reasons of stability, it is preferred that the sweep arms be of equal length. This is not to say that sweep arms of different lengths cannot be used, however. It is expected that such use would produce a spiraling or helical path of the body through the water, which motion applicant considers unstable behavior but which may produce improved performance in terms of the number of fish caught.

Another unlikely contribution to stability is the attachment ring 52 by which the leading edge of the body 10 is attached to the fish line 54. Attachment by means of such a ring produces more stable motion of the body and the sweep arms that does direct attachment of the fish line to the body by means of a snap-action connector, although all other factors are kept the same, including the snap-action connector and adequate swivels in the fish line. Applicant is at a loss to explain this phenomenon, although many fish lures may have taken advantage of it in the past.

FIG. 2 shows in a perspective view the relationships among the trailing vanes on the body and the body itself. Vane 12 is clearly shown as directed away from the viewer and vane 14 is clearly shown as directed more toward the viewer. This relationship is again shown in FIG. 3. The vanes 12 and 14 shown are an integral part of the body. In the best mode, the body 10 is a non-corroding metal, aluminum or brass, for examples, and is made thin enough to be pliable so the vanes 12 and 14 may be bent by hand to any desired angle, as is indicated in phantom lines 62 and 64 in FIG. 3. Thus, the vanes are adjustable to produce the desired rate of rotation at the particular trolling speed to be used. Other means for making adjustable vanes are present in the literature. Locking hinges may be used for attachment of vanes and locking them at a specified angle. The vanes could be made as separate pieces, each preformed to a specific angle, which pieces might slidably engage the trailing edge of the body. Suffice it to say that means are available to provide adjustable vanes.

Another feature shown in the drawings is the means by which the sweep arms are made adjustable in the best mode. The proximal ends of the sweep arms pass through guide holes 72 and 74 and are attached by means of a bolt 76 or other fastener through a selected one of several holes 78 along the central axis of the body. Thus the fisherman may easily adjust the sweep angle of his trolling spreader by using simple tools that he usually carries with him. Other adjustment means may be used without straying from the teachings of this invention. Applicant experimented with attachment means involving various hooks and loops that were suitable but were more complicated than that of the best mode. Simply said, other means exist for providing sweep arms having adjustable sweep angles.

Finally, it should be noted that the body of the device of this invention, while not in any way intended to receive strikes or bites from fish, it having no hooks directly attached thereto, may nonetheless serve as a lure or attractant to fish. The fact that this body has a relatively large surface area relative to the typical baited hook or lure and that it is rotating on an axis that alternately exposes its face and its edge results in the appearance of a flashing body. If the surface of the body 10 is highly colored or highly reflective, this flashing effect may vary effectively attract fish to its locale that would otherwise not be inclined to be there.

Tales of how light and color attract fish are legion. Some lures used on and around a fish hook are silver plated to produce the most highly reflective surface available. These lures are very small relative to the body of the spreader that is the subject of this invention, so their visibility from a distance is much less. Applicant believes that a reflective or a colored rotating body such as the body of the best mode of this invention can increase the effectiveness of the lures or baited hooks attached thereto. Therefore, applicant includes in his disclosure the use for the body of the present invention, of a highly polished planar body, a planar body having a highly reflective coating applied thereto, a planar body having a brightly colored coating applied thereto, and a planar body having a bright pattern applied therto.

While I have shown and described only one embodiment in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. A rotatable spreader for use in fishing and specifically for trolling, said spreader comprising:

a substantially planar body having a surface area on each side thereof and having a leading edge adapted at the forwardmost portion thereof for connecting to a fishing line and a trailing edge adapted to cause rotation of said body about a longitudinal axis thereof when said body moves relative to the surrounding water; and a plurality of elongate sweep arms extending beyond the area of said body said sweep arms being attached at the proximal end thereof to said body such that each sweep arm forms an obtuse angle with said longitudinal axis of said body, each said sweep arm adapted on the distal end thereof for the attachment of additional fishing tackle for attracting and hooking a fish, said sweep arms rotating with said planar body and thereby causing said additional tackle to revolve in a substantially helical path relative to said surrounding water.

2. The rotatable spreader of claim 1 wherein said trailing edge has two oppositely disposed vanes, each of which contributes to causing rotation of said body.

3. The spreader of claim 2 wherein said vanes are of unitary construction with said body.

4. The spreader of claim 3 wherein said vanes are sufficiently pliable that the angle they make with said body may be adjusted.

5. The spreader of claim 2 wherein said vanes are adjustable.

6. The spreader of claim 1 wherein said sweep arms are removable and replaceable.

7. The spreader of claim 1 wherein said obtuse angle is selectively adjustable.

8. The spreader of claim 7 wherein the adjustment of said obtuse angle is effected by providing on said body multiple attachment points for said sweep arm.

9. The spreader of claim 1 wherein at least one of said surface areas is highly light reflective.

10. The spreader of claim 1 wherein at least one of said surface areas is brightly colored.

11. The spreader of claim 1 wherein said trailing edge is adapted for the attachment thereto of an additional piece of additional fishing tackle at a central location along said trailing edge.

12. The spreader of claim 11 wherein said additional piece of additional fishing tackle designed to attract fish.

13. The spreader of claim 12 wherein said additional piece of additional fishing tackle is designed to both attract and hook fish.

* * * * *